Jan. 11, 1938.                W. H. PAGENKOPF                2,105,330
                                 TOOL HOLDER
                              Filed Jan. 10, 1935
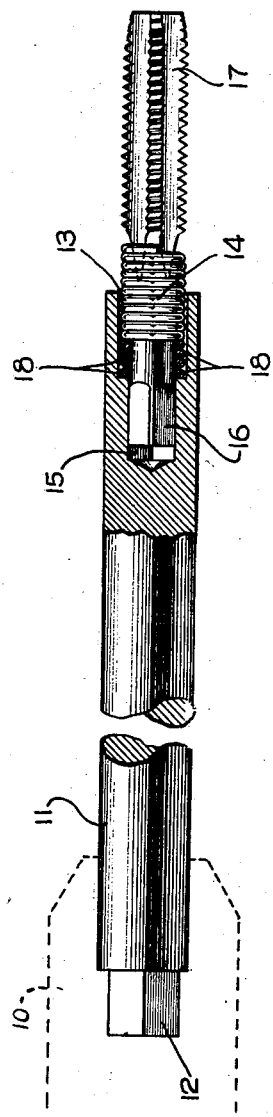
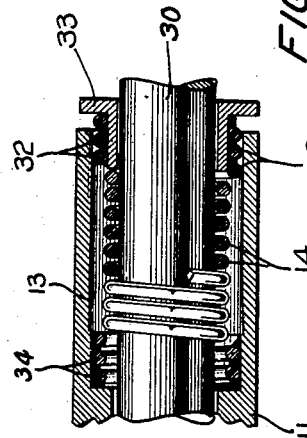
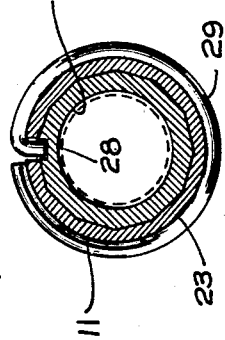
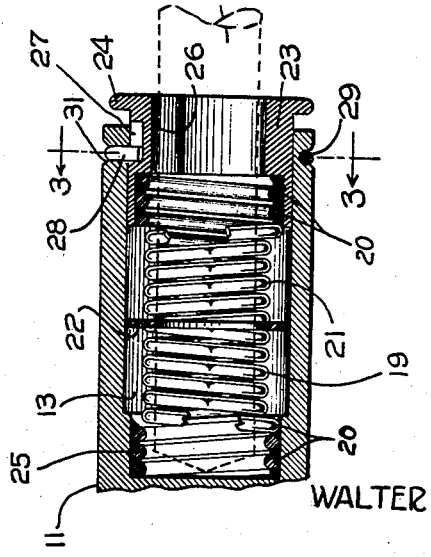
WALTER H. PAGENKOPF
INVENTOR
BY *H.B.Whitfield*
ATTORNEY Patented Jan. 11, 1938

2,105,330

UNITED STATES PATENT OFFICE 2,105,330

TOOL HOLDER

Walter H. Pagenkopf, La Grange, Ill., assignor to Teletype Corporation, Chicago, Ill., a corporation of Delaware Application January 10, 1935, Serial No. 1,165

9 Claims. (Cl. 279—9)

The present invention relates to tool holders and is concerned more particularly with holding devices for cylindrical shank machining tools that may be employed in automatically operated or in hand operated machines.

The principal object of the present invention is the provision of a simple, reliable, and durable tool holder which firmly holds the operating tool against displacement during operation but which permits the quick and easy removal of the tool for replacement.

In carrying out the above and other objects of the present invention, a tool holder is provided comprising a spindle portion having a shank of a conventional or predetermined size to be gripped by the chuck of the operating machine. The spindle of the holder is in turn drilled at its operating end and receives within the drilled hole one end of a spring coil that is preferably secured internally, as by welding or brazing. The dimensions of the spring coil are determined by the size of tool which is to be used, each holder being designed for a predetermined dimension with slight variation. The internal diameter across the convolutions of the spring coil is preferably somewhat less than the diameter of the shanks of the tools or taps to be employed, so that when a tap is inserted, it distends the coil slightly. The direction of the helix of the spring coil is determined by the direction of rotation of the tool during its operation and is designed so that the frictional engagement between the tool and the foremost end of the spring tends to wind the coil. Consequently the tool is firmly held by a constant or increasing binding action during its operation.

In the case of certain tools that are subjected to withdrawal tendencies during operation, the frictional engagement between the tool and the convolutions of the spring coil longitudinally tends also to restrict the size of the coil, introducing a binding action against the withdrawal motion imparted to the tool, and as the spring stretches its coils are further contracted, gripping the tool more firmly. To remove the tool from the holder, the coils are compressed, thus freeing the tool from the gripping action of the coils of the spring.

For a more comprehensive understanding of the invention, reference may be had to the accompanying illustrations and to the detailed specification following hereinafter, wherein like reference characters designate similar parts throughout and wherein:

Fig. 1 is an elevational view partially in section, illustrating a tool holder in which are embodied certain features of the present invention;

Fig. 2 is an enlarged detail sectional view of the chuck end of a modified form of tool holder;

Fig. 3 is a transverse sectional view taken approximately on line 3—3 of Fig. 2, and Fig. 4 is a longitudinal sectional detail view similar to Fig. 2 but featuring another modified structure embodying certain features of the present invention.

Referring now more particularly to the illustrations in the accompanying drawing, the reference character 11 indicates generally the shank or spindle portion of a tool holder that is made of a cylindrical rod. To secure the holder 11 within a chuck 10 of an operating machine, one end is squared as at 12 or, if preferred, may be shaped in any other manner in accordance with the accommodations and requirements of a particular machine.

The opposite end of the holder is preferably drilled to provide a cylindrical hole 13 somewhat larger than the external diameter of a spring coil 14. If preferred, the internal portion of the opening may be extended and broached as at 15 to in turn receive the squared end 16 of a tool, in the particular illustration, a tap 17. The portion of the hole 13 into which the spring coil 14 is received is usually of considerably larger diameter than the broached section 15.

When first securing the coil 14 to the holder, it is distended upon an application tool which comprises a rod section, preferably of non-metallic substance, whose diameter is slightly larger than the diameter of the tool shanks to be served. The assembly is then inserted into the opening 13 and the end convolutions 18 secured to the peripheral wall of the opening 13 in any suitable manner, as by brazing or welding. Following this operation, the application tool is withdrawn, permitting the remaining convolutions of coil 14 to recede, but because of the welding or brazing which has been applied, the end convolutions 18 will remain in their distended condition. Thereafter, when a subjective or operating tool is inserted, the so-called remaining convolutions of coil 14 will be expanded in accordance with the larger diameter of the tool until they are nearly of the same diameter as the end convolutions 18.

The tool illustrated in Fig. 1 is a conventional tap having, as described before, the squared head 16 which is received within the broached section 15. This prevents rotational freedom of the tool during operation and is essential especially in the case of tools as in the nature of taps which are reciprocated during operation. Where, however, as in the case of tools that are continuously rotated in one direction, the present invention lends further utility by affording a torsional check and thereby obviating the necessity of the squared shank and broached hole for receiving it. The convolutions of the coil 14 must in this case be wound in a corresponding helix so as to bind and seek to further constrict while engaging the tool during its operative rotation. This means, of course, that the direction of the helix of spring 14 would depend upon the direction of active rotation of the particular tool.

The friction engagement between the inner surface of the convolutions and the cylindrical surface of the shank of a particular tool causes the coil 14 to seek to be further constricted as far as this may be permitted, thereby biting in more firmly and gripping the shank more tenaciously. So, too, in attempting to withdraw the tool 17 by pulling it outwardly, the convolutions of coil 14 are constricted by reason of the elongation of the helix. This constriction is limited, of course, by the engagement of the inner surfaces of the convolutions 14 with the shank of tool 17, resisting the efforts of withdrawing the tool 17 more firmly as the withdrawing force increases.

Where it is desired to replace the tool or to dismantle the assembly, the tool 17 may be quickly and easily withdrawn by compressing the coil 14, the adjacent convolutions being normally spaced as best viewed in Figs. 2 and 4, thereby enlarging the internal diameter of the coil 14 while at the same time permitting the withdrawal of the tool 17 free from interference.

In the form of tool holder illustrated in Fig. 2, the principles set forth in accordance with the disclosure of Fig. 1 have been carried forward by the provision of means for checking the action of tools that are to be rotated in either or both directions, as is the case with certain lapping tools, taps, and reamers. In this embodiment a pair of spring coils 19 and 21 are employed, separated by a spacer ring 22. The spring coils 19 and 21 are of opposed helixes, each functioning individually in its direction for checking the torque action of a subjective tool, and each functioning in preventing withdrawal tendencies thereof in one direction. The innermost coil 19 may be preferably secured to the shank 11 in the same way as was described above, while the outer coil 21 is secured in a similar manner to the sleeve 23. As in the case of the preferred embodiment, certain convolutions indicated 20 remain normally distended while the remaining convolutions are permitted to recede to their normal size whence they function as the active contacting elements for engaging the shank of an operating tool 30, indicated in the instant illustration with broken lines. Because of the double checking performance that is characteristic of this embodiment, the broaching such as that indicated 15 in Fig. 1 is unnecessary to insure torsional grip.

The sleeve 23, to which the foremost coil 21 is secured, is provided with a flange 24 that may be easily engaged by the thumb and index fingers for purposes of withdrawing the tool. The outer diameter of its main body portion chambers within the opening 13 which is slightly larger at its foremost end and reduced as at 25 near its rearmost end. The inner extremity of ring 23 has an enlarged internal diameter corresponding in size with the reduced diameter 25 of the main opening 13, into which the convolutions 20 of coil 21 are received. The remaining internal diameter 26 of sleeve 23 is slightly larger than that of the shank of tool 30.

To prevent the inadvertent withdrawal of sleeve 23 and in order to govern its movement longitudinally, a small slot 27 is machined in its periphery into which there is received an inwardly extending projection 28, see also Fig. 3 of a lock ring 29 that fits into a peripheral groove 31 which encircles the foremost end of the holder 11. Because of the torsional strains which may be imparted to the projection 28 by the impulses originating with the rotating tool and communicated through the spring coil 21, the sleeve 23 may be made polygonal in cross section, as indicated in Fig. 3, or may be of any other cross-sectional shape which will promote a similar result.

In the illustration of Fig. 4, there is featured a construction having the same general utility set forth in connection with the foregoing description of Fig. 1, but embodying certain detailed improvements thereover. Here the coil 14 is secured not only as at 34 to the inner peripheral wall of the tool 11, but also at its opposite end 32 to a sleeve 33 which because of its regular shape and smooth finish functions as a convenience for manually gripping the end of the spring 14 while also preventing the terminal convolutions 32 from becoming inadvertently distorted, a result which might follow because of careless handling in the insertion and removal of tools 30. The inner diameter of sleeve 33 is somewhat larger than the diameter of the shank of tool 30, permitting a slight clearance therebetween, the only gripping agency being the convolutions 14. The features of this embodiment are otherwise generally similar to those illustrated in Fig. 1, and the manner of operation is also akin to that described in connection with the showing in Fig. 1.

For the sake of clearness in understanding the action of certain elements employed in the embodiments herein disclosed, minute dimensions have been exaggerated in order to make them readily perceptible; for example, the contrast in the dimensions between the inner convolutions of coil 14 and the outer convolutions illustrated 34 and 32. The real difference in the size of the two coils may in fact be so slight as to be hardly perceptible in the illustration of a tool holder drawn on a scale of the size used in Figs. 2 and 4.

While the present invention has been explained and described with reference to certain embodiments specifically set forth in the foregoing specification and illustrated by the accompanying details, it is to be understood that numerous modifications and variations may be incorporated without departing from the spirit or scope of the invention. Accordingly, it is not desired to be limited to the species hereinbefore set forth except as defined by the hereunto appended claims.

What is claimed is:

1. A tool holder comprising a body section having a circular opening endwise thereof, a spring coil having intermediate convolutions normally disposed in a contracted condition, and terminal convolutions distended to an enlarged diameter and in their distended condition secured to the internal wall within said circular opening.

2. In a holder for gripping rotatable machining tools, a body section having a cylindrical opening endwise thereof, a pair of spring coils of opposite helixes supported within said opening, a spacer element between the abutting ends of said coils, and means for securing said coils within the peripheral wall of said opening.

3. In a holder for removably gripping cylindrical shanks, a body portion having a longitudinal cylindrical opening endwise thereof, a spring coil in said opening having a helix wound in a predetermined direction, one end of said helix being expanded against the normal spring tendencies of said coil and thereat secured to the peripheral wall of said opening, a sleeve, a spring coil having a helix opposite to that of said first mentioned spring coil, and means for securing the end of said second mentioned coil to said sleeve.

4. In a tool holder, a main body portion having a longitudinal opening endwise thereof, a plurality of spring coils having opposite directional helixes arranged in endwise alignment within said opening, means for confining said coils within said opening, and a spacer element between abutting ends of said coils.

5. A chuck for holding small cylindrical shank tools such as taps, comprising a body portion having a longitudinal opening to receive a shank portion of a tool therein, said opening having an enlargement at its terminus, and a spring helix having one end expanded and secured to the inner surface of said body portion within said enlargement and having an internal diameter slightly less than the diameter of said longitudinal opening, said helix having convolutions normally spaced from each other and of longitudinal extent to protrude beyond the extremity of said holder.

6. In a holder for rotatable machining tools, a longitudinal body portion having an opening endwise thereof of non-circular cross-section, a spring helix secured within said opening having an internal diameter minutely smaller than the external diameter of tools to be held, and a sleeve within said opening having a cross-sectional shape and size to chamber within said opening so as to obtain free longitudinal movement therein, said sleeve having secured to it the foremost convolutions of said helix.

7. In a holder for rotatable machining tools, a body portion having a longitudinal opening of polygonal cross-section, a spring helix contained within said opening, and a sleeve within said opening having a polygonal cross-section corresponding to that of said opening for restricting said sleeve to longitudinal movement therein, said sleeve having secured to it the foremost convolutions of said helix.

8. In a tool holder, a body portion having an opening longitudinally thereof, a spring helix contained internally of said opening having spaced convolutions for receiving tool shanks longitudinally thereof, and a collar surrounding the foremost convolutions of said helix and secured to said helix at a distended section thereof.

9. A tool holder comprising a body section having an opening endwise thereof, and a spring coil having active convolutions normally in a contracted condition and other convolutions enlarged beyond the diameter of said active convolutions and secured to the internal wall within said opening.

WALTER H. PAGENKOPF.